Oct. 15, 1935.  J. P. TAYLOR  2,017,264
MILK BOTTLE CRATE
Filed Nov. 4, 1933  2 Sheets-Sheet 1
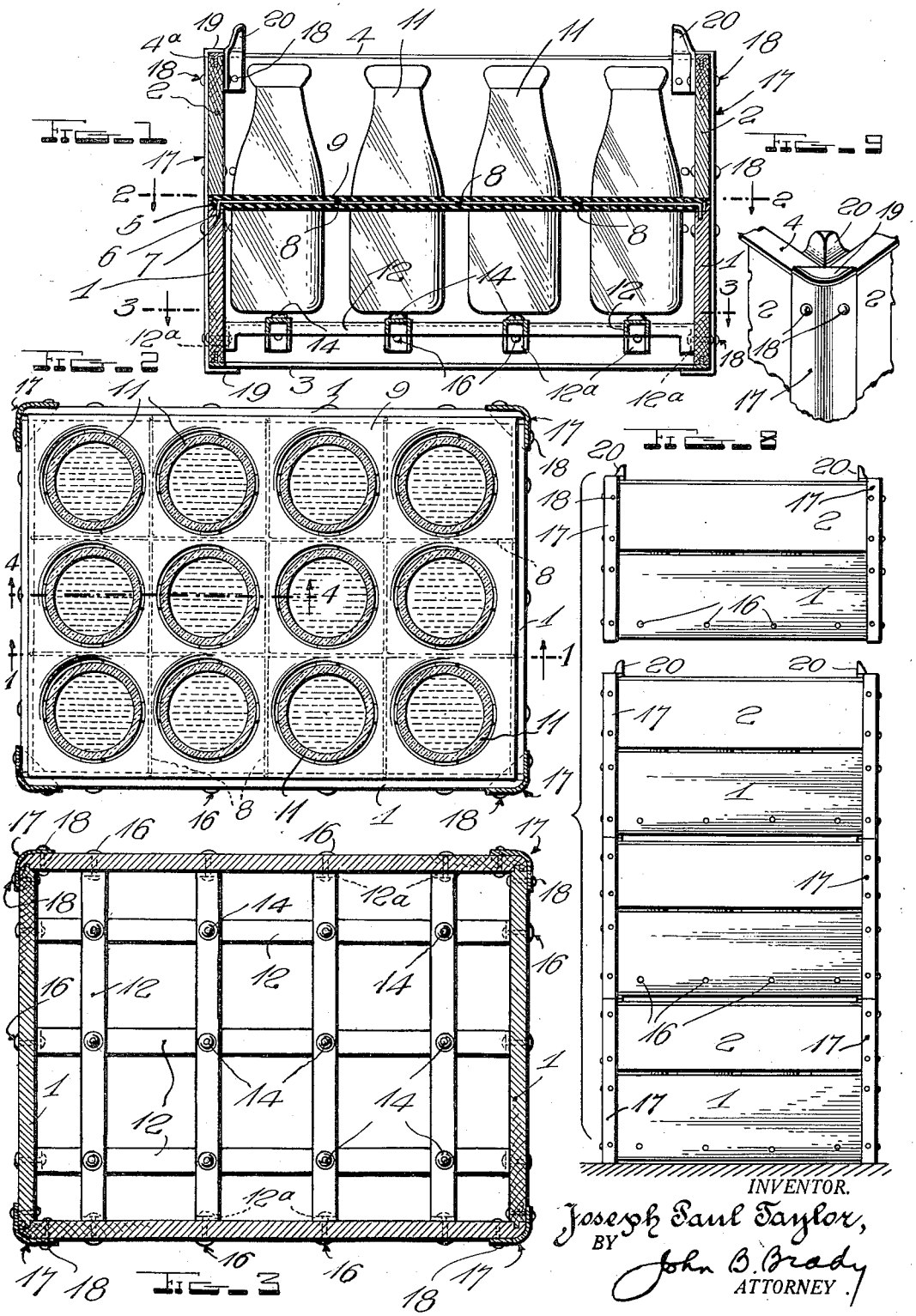
INVENTOR.
Joseph Paul Taylor,
BY John B. Brady
ATTORNEY.

Oct. 15, 1935.   J. P. TAYLOR   2,017,264
MILK BOTTLE CRATE
Filed Nov. 4, 1933   2 Sheets-Sheet 2
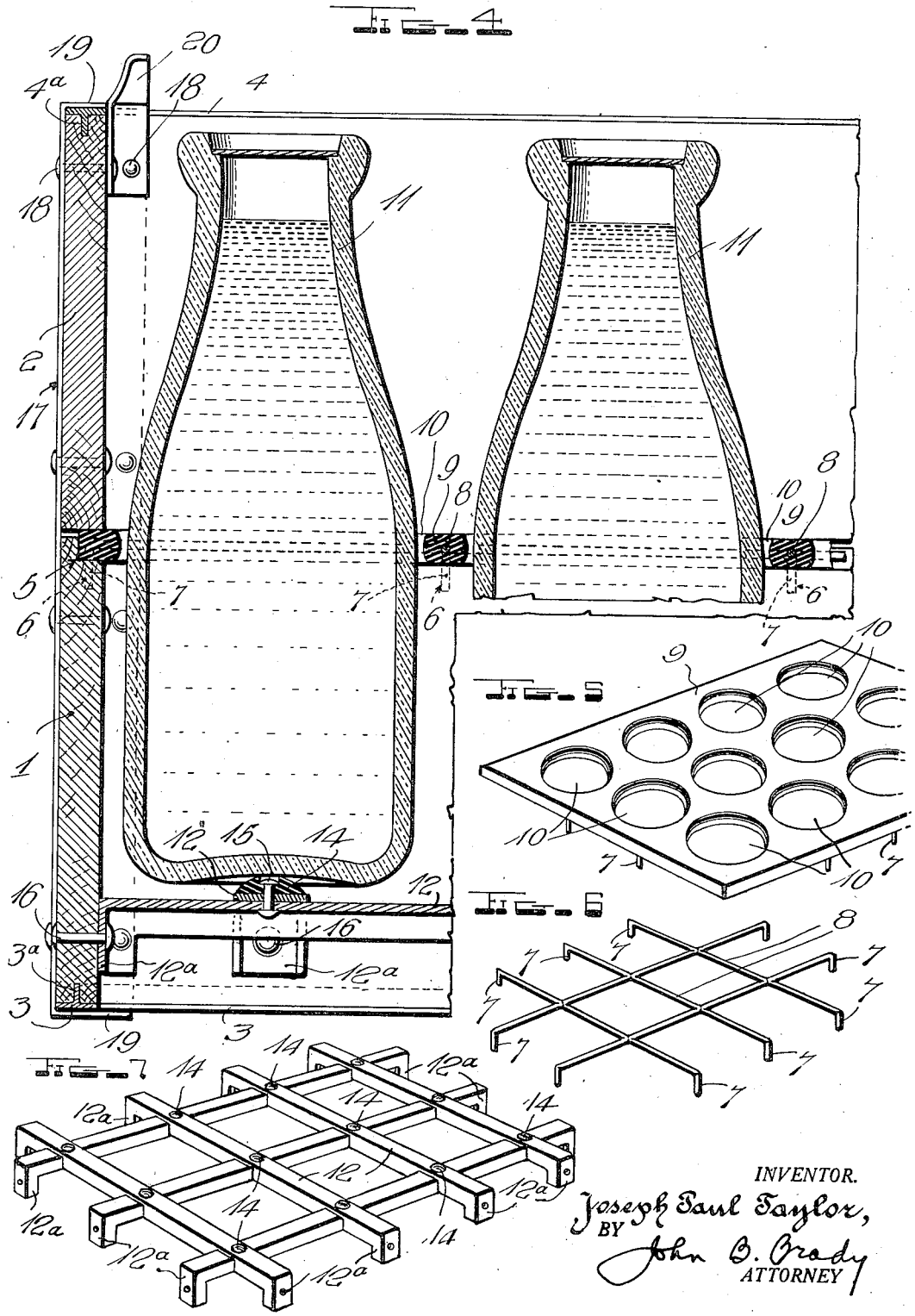
INVENTOR.
Joseph Paul Taylor,
BY John B. Brady
ATTORNEY Patented Oct. 15, 1935

2,017,264

UNITED STATES PATENT OFFICE 2,017,264

MILK BOTTLE CRATE

Joseph Paul Taylor, Detroit, Mich., assignor, by mesne assignments, of one-fifth to Miles A. Crysler, one-fifth to Edward S. Fox, one-fifth to Friendy J. Crysler, one-fifth to Edgar D. Little, and one-fifth to Lewis F. Brady, all of Detroit, Mich.

Application November 4, 1933, Serial No. 696,700

14 Claims. (Cl. 217—19)

My invention relates broadly to crates and more particularly to an improved construction of crate for transporting milk bottles.

One of the objects of my invention is to provide a construction of milk bottle crate which is capable of withstanding rough usage under conditions of severe strains without breakage.

Another object of my invention is to provide a construction of milk bottle crate in which the bottles, while being capable of limited movement, are muffled in such movement so that the crates may be handled with substantially no noise, which is so undesirable where delivery of milk is made in communities in early hours of the morning at times when any noise incident to milk delivery becomes a nuisance.

Still another object of my invention is to provide an improved construction of milk bottle crate which includes a grid shaped base and a laterally extending separator by which milk bottles may be mounted and maintained in predetermined spacial relation in a position in which the bottles and crate may be readily washed by submerging the loaded crate in a cleansing bath.

A further object of my invention is to provide a construction of milk bottle crate which is formed in two lateral sections having means at the adjoining edges of both sections of the crate for rapidly uniting the two sections with respect to a grid shaped base and an intermediate separator.

A still further object of my invention is to provide a construction of milk bottle crate having an improved arrangement of stacker irons interconnected with the reinforcing members of the crate for facilitating the stacking of the loaded milk bottle crates.

Another object of my invention is to provide a construction of molded separator for insuring the noiseless assembly of milk bottles in a milk crate with means for supporting the separator in a rigid manner laterally of the crate.

Other and further objects of my invention reside in the construction of a rigid milk crate as set forth more fully in the specification hereinafter following by reference to the acompanying drawings, in which:

Figure 1 is a central vertical longitudinal sectional view through the milk bottle crate on line 1—1 of Fig. 2; Fig. 2 is a horizontal sectional view through the milk crate on line 2—2 of Fig. 1; Fig. 3 is a horizontal sectional view taken on line 3—3 of Fig. 1; Fig. 4 is an enlarged fragmentary vertical section through the milk crate on line 4—4 of Fig. 2; Fig. 5 is a perspective view of the foraminated separator employed in the crate of my invention; Fig. 6 is a perspective view of the supporting grid for the separator; Fig. 7 is a perspective view of the bottle supporting grid employed in the crate of my invention; Fig. 8 shows a series of crates embodying my invention and disposed in stacked arrangement; and Fig. 9 is a perspective view showing the connection of the stacker iron with the reinforcing means of the crate.

The milk bottle crate of my invention is formed by two lateral sections which are secured relatively to each other by reinforcement angle members which are riveted to each of the lateral sections, the lower lateral section providing a support for a grid formed from relatively stiff channel shaped strips, which are riveted at opposite ends to the side walls and ends of the crate. The grid which is constituted by the laterally and longitudinally extending channel shaped strips is provided at each junction of the strips with an abutment member constituting a shock absorber upon which each of the milk bottles is adapted to seat. The upper periphery of the lower section of the crate is provided with a seat in which a laterally extending molded separator and an internally mounted wire grid is supported. The wire grid provides a reinforcement for the foraminated separator which is preferably formed of rubber. The foraminated separator is gripped at its peripheral edges between the upper and lower sections of the crate when the two sections of the crate are secured in position by the reinforcing means. The exposed peripheral edges of each of the crate sections are reinforced by a metallic beading which is rigidly embedded in the upper and lower edges of each of the crate sections by a central rib. Stacker irons are secured in the corners of the upper section of the crate by rivet members which also pass through the angular members which form reinforcing means for each corner of the crate. The milk bottles are seated upon the shock absorbing seats and contact substantially with the edges of the apertures in the separator. Hence movement of the bottles is restricted and physical contact between the bottles is prevented. Shaking of the crates during transport with the bottles loaded therein is not accompanied by undesirable noise. The crate may be readily washed with empty bottles loaded therein by submerging the entire crate in a cleansing bath. The water freely passes through the grid shaped supporting bottom and around the bottles in the separator.

Referring to the drawings in more detail, reference character 1 designates the lower crate section and reference character 2 shows the upper crate section superimposed thereon. The lower peripheral edge of the lower crate section 1 is reinforced by a protective beading represented at 3. The protective beading 3 is substantially T-shaped in cross section, with the T portion 3a thereof entering a preformed groove in the lower peripheral edge of the crate section 1. The bead 3 may be formed by a rolled section as shown, or a metallic strip may be folded to provide the required section of the contour illustrated. The upper section 2 has the upper peripheral edge thereof protected by a similar bead illustrated at 4 and having a similar projecting portion 4a engaging a peripheral groove in the upper portion of the crate section 2. The lower crate section 1 is provided with a peripheral recess 5 which extends around the entire interior periphery of the lower crate section 1. The recess 5 has a multiplicity of spaced sockets 6 formed therein to receive the downwardly depending ends 7 of the wire grid 8, which is shown more clearly in Fig. 6. The wire grid 8 is formed by a multiplicity of wire-like members which extend normal to each other and are suitably connected at their junctions to provide a rigid laterally extending wire-like reinforcing support for the foraminated separator 9. The rigid internal reinforcement thus provided serves to stiffen the separator plate 9 and serves as a mounting means for the foraminated separator plate 9 by means of the engagement of the ends of the grid 8 with the sockets 6 in the crate section 1. The foraminated separator plate 9 containing apertures 10 is formed of rubber or material which will provide a buffer action with respect to the milk bottles 11 which are supported in the crate. I select rubber by reason of its ability to suppress noise under conditions of continuous bumping or vibration of the walls of the milk bottles with respect thereto. The separator is of such shape that it can be readily molded from a composite body or stamped from sheet material. The interior peripheral edges of each of the apertures 10 are rounded in order to present substantially line contact to the cylindrical walls of the milk bottles supported in the crate. The lower section 1 of the crate provides a support for the base grid represented at 12. The base grid comprises laterally and longitudinally extending channel shaped strip-like members extending normal to each other and which support at each junction rubber abutments represented at 14. The rubber abutments 14 are riveted to the junctions of the strips constituting the grid shaped base as represented at 15 in Fig. 4. The laterally extending strips extend over the longitudinally extending strips as shown, the channel portions of the laterally extending strips being mortised to allow the longitudinally extending strips to extend beneath the laterally extending strips. The ends of the channel shaped strips constituting the grid shaped base are bent downwardly normal to the plane of the grid shaped base as represented at 12a and provide securing means for the grid shaped base. The downwardly extending ends 12a are riveted to the side walls and ends of the lower section 1 of the crate as shown at 16, thereby forming a rigid structure.

The corners of the superimposed sections 1 and 2 are reinforced by means of angular members 17. The angular members 17 are riveted to the side walls of the sections of the crate by means of rivets indicated at 18. The angular members 17 are provided with laterally extending portions 19 at the upper and lower extremities thereof for reinforcing the top and bottom of the crate.

In order to facilitate stacking of the crates I provide stacker members 20 in the form of pressed metal elements which may be readily stamped from sheet metal which are riveted by means of the same rivets 18 which connect the reinforcing angular members 17 with the corner of the crate. The stacker members 20 enable a multiplicity of crates to be stacked in superimposed relation as illustrated in Fig. 8 and rigidly maintained in position.

The structure of the milk crate of my invention has been found to be highly practical for manufacture on a quantity basis. The milk crate contains many desirable features with respect to strength and rigidity and ability to withstand shocks and strains. The crate may be manufactured inexpensively on a quantity basis and yet provide a carrier which is superior to crates heretofore known in the art.

While I have described my invention in one of its preferred embodiments, I desire that it be understood that modifications may be made and no limitations upon my invention are intended other than are imposed by the scope of the appended claims.

What I claim as new and desire to secure by Letters Patent of the United States is as follows:

1. A milk bottle crate comprising an upper and lower substantially rectangular section, a peripheral groove formed in said lower rectagular section, a grid shaped member, an apertured separator reinforced by said grid shaped member and supported in said peripheral groove, and means for securing said upper and lower sections in superimposed relation for clamping said separator therebetween for providing spacing means for a plurality of bottles in said crate.

2. A milk bottle crate comprising an upper and a lower substantially rectangular section, a peripheral groove formed in the upper edge of said lower section, an apertured separator formed of sound deadening material supported in said peripheral groove, a base supported by said lower section, abutments formed of sound deadening material disposed on said base and providing mounting means for bottles disposed in said apertured separator, and means for maintaining said upper and lower sections in superimposed relation for clamping said separator therebetween.

3. A milk bottle crate comprising an upper and lower substantially rectangular section, an apertured separator plate disposed between said sections, a support carried by said lower section, resilient abutments disposed on said support, and means for clamping said sections in superimposed relation for maintaining said separator plate therebetween.

4. A milk bottle crate comprising an upper and lower substantially rectangular section, the upper portion of said lower section having a peripheral groove, a reinforcing grid member comprising elements extending at right angles to each other with the ends of the elements anchored in the bottom of said groove, an apertured separator plate formed of resilient material substantially encompassing said reinforcing grid and resting in said groove, a grid shaped base mounted in said lower section and having means centered below the apertures in said separator plate for supporting milk bottles in said crate in predetermined spacial relation, and means interconnecting said upper and lower sections for clamping said separator plate therebetween.

5. A milk bottle crate comprising a pair of substantially rectangular sections, an apertured separator plate molded of rubber and secured between said sections, a base member carried by one of said sections and providing molded rubber supports for milk bottles extending through the apertured separator plate and supported by said base member.

6. A milk bottle crate comprising an upper and lower substantially rectangular section, a grid shaped base supported by said lower section, an abutment molded of sound suppressing material carried by each junction in said grid shaped base, an apertured separator plate molded of the same sound suppressing material clamped between said sections and including apertures therein for maintaining milk bottles supported on said abutments in predetermined spacial relation, and means interconnecting said upper and lower crate sections for maintaining said crate sections in superimposed relation.

7. A milk bottle crate comprising an upper and lower section, a rubber separator plate disposed laterally between said sections and apertured for the passage of a plurality of milk bottles, a grid shaped base comprising a plurality of laterally and longitudinally extending channel members anchored at opposite ends in said lower crate section, abutments carried by the junctions of said channel members, said separator plate having apertures therein aligned with the abutments carried by said base for maintaining said milk bottles supported by said abutments in predetermined spacial relation, and means for aligning said crate sections in superimposed relation.

8. A milk bottle crate comprising an upper and lower section, a grid shaped base comprising a multiplicity of laterally and longitudinally extending channel members fixed to said lower crate section, resilient abutments carried by said base at the intersections of said laterally and longitudinally extending channel members, a separator having a multiplicity of apertures therein each aligned with the abutments on said base, means for aligning said upper and lower sections in superimposed relation whereby milk bottles supported by the resilient abutments on said base are maintained in predetermined spacial relation by the apertures in said separator plate.

9. A milk bottle crate comprising an upper and lower section, a grid shaped base comprising a multiplicity of laterally and longitudinally extending channel members fixed to said lower crate section, rubber abutments carried by said base at the intersection of said laterally and longitudinally extending channel members, a rubber separator plate having a multiplicity of apertures therein each aligned with the rubber abutments on said base, means for aligning said upper and lower sections in superimposed relation whereby milk bottles supported by the abutments on said base are maintained in predetermined spacial relation by the apertures in said separator plate.

10. A milk bottle crate comprising an upper and lower superimposed section, a reinforcing bead carried by the upper periphery of the upper section, a reinforcing bead carried by the lower periphery of the lower section, a peripheral groove formed in the upper periphery of the lower section, a reinforced separator plate disposed in said groove, a base member carried by said lower section, said separator plate having apertures therein for the passage of milk bottles, and resilient abutments carried by said base member in alignment with each of the apertures in said separator plate.

11. In a milk bottle crate as described in claim 10, an upper and lower section, a metallic strip reinforcing the upper periphery of said upper section, a metallic strip reinforcing the lower periphery of said lower section, and means interconnecting said sections and maintaining said sections in superimposed relation.

12. A milk bottle crate comprising a pair of crate sections, a rubber separator plate disposed laterally between said crate sections, a base carried by the lower crate section, abutments disposed at predetermined spaced intervals on said base, said separator being apertured immediately above each of said abutments, and a metallic member extending laterally of said crate sections and reinforcing said separator plate.

13. A milk bottle crate comprising a pair of crate sections, a rubber separator plate disposed laterally between said crate sections, a base carried by the lower crate section, abutments disposed at predetermined spaced intervals on said base, said separator being apertured immediately above each of said abutments, and a grid shaped member comprising laterally and longitudinally extending metallic rods having opposite ends anchored in the walls of said lower crate section and reinforcing said rubber separator plate.

14. A crate comprising a frame structure including vertically disposed side and end walls, a base secured to the walls of said crate, a separator comprising a grid-like member formed of resilient material and having apertures for the passage of bottles therethrough, a reinforcement member and means for anchoring the ends of said reinforcement member into the walls of said crate said reinforcement member being disposed substantially within said separator.

JOSEPH PAUL TAYLOR.